United States Patent Office 3,391,132
Patented July 2, 1968

3,391,132
WATER-SOLUBLE, UNSYMMETRICAL CHROMIUM-CONTAINING AZO DYESTUFFS
Fabio Beffa, Basel, and Eginhard Steiner, Allschwil, Switzerland, assignors to J. R. Geigy A.G., Basel, Switzerland
No Drawing. Filed July 12, 1965, Ser. No. 471,385
Claims priority, application Switzerland, July 31, 1964, 10,071/64
10 Claims. (Cl. 260—145)

ABSTRACT OF THE DISCLOSURE

Water soluble unsymmetrical 1:2 chromium complex dyes of the formula

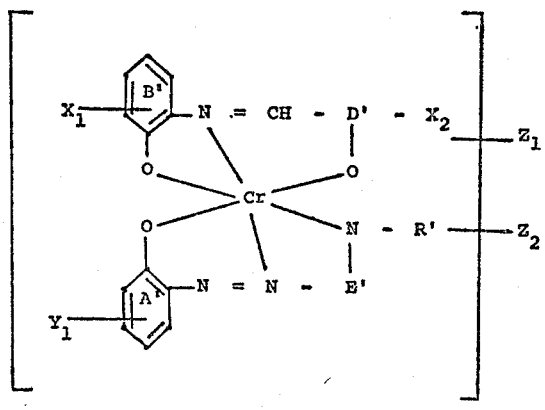

wherein D' represents phenyl or

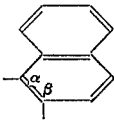

linked in α-position to the —CH= and in the β-position to the adjacent oxygen bridge,

represents

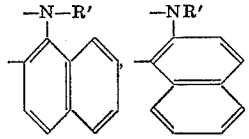

or

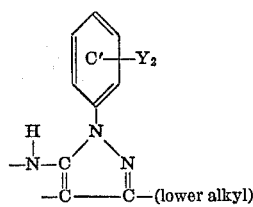

R' represents hydrogen, lower alkyl, hydroxy-lower alkyl or phenyl, one of $X_1$ and $X_2$ represents the grouping G'—N=N— and the other X represents G'N=N— or hydrogen, nitro, halogen, phenylsulfonyl or lower alkanoylamino;
G' represents phenyl, halogen-substituted phenyl, lower alkyl-substituted phenyl, nitrophenyl, lower alkoxy-phenyl, phenoxyphenyl, lower alkyl phenoxyphenyl, halogen - substituted phenoxyphenyl, phenyl-sulfonyl-phenyl, lower alkyl-substituted phenyl-sulfonyl-phenyl or halogen-substituted phenyl-sulfonyl-phenyl, naphthyl, 2-benzothiazolyl, 2-thiazolyl, 2-imidazolyl, 2-benzimid-azolyl or pyridyl;
$Y_1$ represents hydrogen, nitro, halogen or lower alkyl;
$Y_2$ represents hydrogen or halogen;
$Z_1$ represents sulfo, carboxyl, sulfamyl, lower alkyl-sulfonyl, or N-lower alkyl-substituted sulfamyl; and
$Z_2$ represents hydrogen or sulfamyl, lower alkylsulfamyl or N-lower alkyl-substituted sulfamyl;

each of $Z_1$ and $Z_2$ being linked to an aromatic ring carbon atom of A', B', C', D', E', or G', which new dyestuffs are suitable for the dyeing and printing of fibers containing polyamide, e.g. natural polyamide material, especially wool or silk or leather, or synthetic polyamide material such as nylon or polyurethane fibers.

This invention relates to new water soluble, chromium-containing dyestuffs, a process for the production thereof, their use for the dyeing of fibers containing polyamide as well as, as industrial products, fibrous polyamide materials dyed with these dyestuffs.

The novel dyestuffs to which the invention relates are unsymmetrical chromium complexes, of a molar chromium-to-dyestuff ratio of 1:2, in which one of the dyestuff radicals of the complex molecule is an o,o'-dihydroxy azomethine dyestuff radical and the other is an o-hydroxy-o'-amino-monoazo dyestuff radical, which dyestuffs are distinguished from known mixed chromium complex dyes by the o'-amino bridge on the one hand and by an arylazo substituent in one or both moieties of the aforesaid azomethine dyestuff radical, on the other hand.

These dyestuffs possess the unexpected property of dyeing polyamide fibers such as wool, silk or nylon level with a combination of excellent fastness to wet media, especially to washing, and a light fastness which is surprisingly superior to that of structurally closest known dyes.

More in particular, the invention concerns the novel, water-soluble dyestuffs of the formula

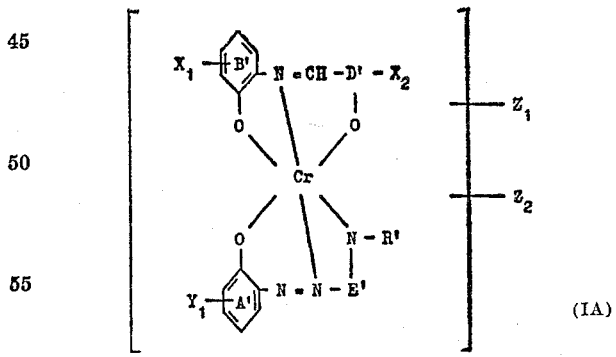

(IA)

wherein D' represents phenyl or

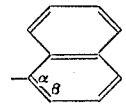

linked in α-position to the —CH=, and in β-position to the adjacent oxygen bridge,

represents

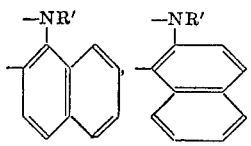

or

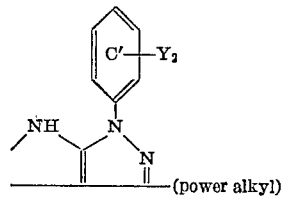

R' represents hydrogen, lower alkyl, hydroxy-lower alkyl or phenyl, one of $X_1$ and $X_2$ represents the grouping G'—N=N— and the other X represents G'—N=N— or hydrogen, nitro, halogen, phenylsulfonyl or lower alkanoylamino;

G' represents phenyl, halogen-substituted phenyl, lower alkyl-substituted phenyl, nitrophenyl, lower alkoxyphenyl, phenoxyphenyl, lower alkylphenoxyphenyl, halogen-substituted phenoxyphenyl, phenyl-sulfonyl-phenyl, lower alkyl-substituted phenyl-sulfonyl-phenyl or halogen-substituted phenyl-sulfonyl-phenyl, naphthyl, 2-benzothiazolyl, 2-thiazolyl, 2-imidazolyl, 2-benzimidazolyl or pyridyl;

$Y_1$ represents hydrogen, nitro, halogen or lower alkyl;

$Y_2$ represents hydrogen or halogen;

$Z_1$ represents sulfo, carboxyl, sulfamyl, lower alkylsulfonyl, or N-lower alkyl-substituted sulfamyl; and $Z_2$ represents hydrogen or sulfamyl, lower alkylsulfamyl or N-lower alkyl-substituted sulfamyl, each of $Z_1$ and $Z_2$ being linked to an aromatic ring carbon atom of A', B', C', D', E' or G', which new dyestuffs are suitable for the dyeing and printing of fibers containing polyamide, e.g. natural polyamide material, especially wool or silk or leather, or synthetic polyamide material such as nylon or polyurethane fibers.

The dyeings on polyamide fibers attained with the dyestuffs according to the invention have very good fastness to light, to alkali, to rubbing and good wet fastnesses, in particular good washing, milling and sea water fastness.

Polyamide dyeings, and epsecially wool dyeings obtained with the dyestuffs according to the invention unexpectedly have fastness to milling and to washing under severe conditions (of degree 3) which is superior to that of known chromium-containing dyestuffs which contain no groups which dissociate acid in water and which contain 1 molecule of an o-hydroxy-o'-amino-monoazo dyestuff and 1 molecule of an o,o'-dihydroxyazomethine dyestuff having no arylazo groups, per chromium atom. Compared with known dyestuffs of the same type which contain sulfonic acid groups, the new dyestuffs show superior fastness to washing (even of degree 3) of their wool dyeings, a greater propensity for the level dyeing of heterogeneous mixtures of wool of various origin ("tippy wool") and also better fastness to washing and hot water (for instance with regard to the change in shade of their dyeings on silk). Compared with other known chromium complex dyestuffs lacking an aforesaid arylazo-substituent, they have better fastness to washing of degree 3 and to milling, greater stability against injury by boiling and increased drawing power from a neutral bath as well as less tendency to give tippy dyeings on wool. Compared with known water-soluble, chromium-containing dyestuffs which contain per chromium atom 1 molecule of an o,o'-dihydroxymonoazo dyestuff and 1 molecule of an o,o'-dihydroxyazo-azomethine dyestuff, the wool dyeings of the dyestuffs according to the invention have surprisingly better light fastness, particularly with light shades.

Among the dyestuffs of Formula IA, those falling under the following formula:

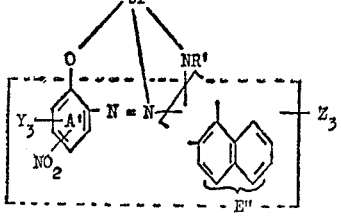

wherein each of $X_1$, $X_2$ and R' has the same meaning as in Formula IA, $Y_3$ represents hydrogen or nitro, and $Z_3$ represents —$SO_3H$ or —COOH linked to one of the aromatic ring carbon atoms of benzene nucleus A' or naphthalene nucleus E'', impart particularly good light and wet fastness properties to dyeings thereof on polyamide fibers, and especially on wool. Optimal light fastness in wool dyeings is afforded by dyestuffs of Formula IB in which R' is hydrogen and $Z_3$ is an —$SO_3H$ group linked to a carbon atom of naphthalene nucleus E''.

Water-soluble, chromium-containing dyestuffs are obtained by reacting either simultaneously or one after the other, a monoazo dyestuff of the formula

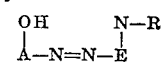 (I)

and an azo-azomethine dyestuff of the formula

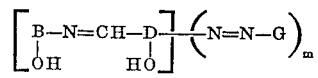 (II)

the dyestuffs of Formulas I and II together containing at least one water-solubilizing group, with an agent giving off chromium to form a complex dyestuff of the formula

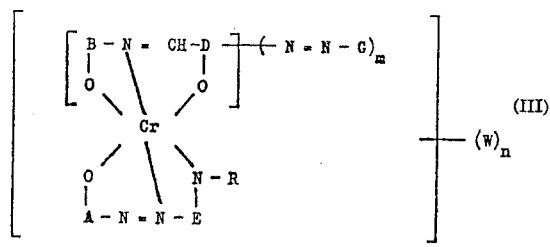

which comprises the dyestuffs of Formula IA.

In these Formulas I, II and III,

A, B, and D each represent a radical of the benzene or naphthalene series which contains —O— in a position adjacent to the azo or azomethine bond, E represents a radical of the naphthalene or pyrazole series which contains

in a position adjacent to the azo bond,

R represents hydrogen or an unsubstituted or substituted lower alkyl or aryl radical, G represents a carbocyclic-aromatic or heterocyclic-aromatic radical, W represents a water-solubilizing group, and $m$ and $n$ each represent 1 or 2.

If E is a naphthalene radical then it is advantageously bound in the 1,2-position to the azo and amino group.

If E is a pyrazole radical then it is bound in the 4-position to the azo group and in 5-position to the amino group. This pyrazole radical is preferably substituted in the 1-position by an aromatic radical, particularly one of the benzene series, and in the 3-position by an aliphatic radical, i.e. a lower alkyl radical.

If R is an unsubstituted lower alkyl radical then it is, for example, the methyl or ethyl radical. If this radical contains substitutents, then examples thereof are the hydroxyl group, lower alkoxy groups such as the methoxy or ethoxy group, or the cyano group. If R is an aryl radical then it is chiefly one of the benzene series.

If G is a carbocyclic-aromatic radical then it is particularly a radical of the benzene or naphthalene series. However, if G is a heterocyclic-aromatic radical, then it is, for example, the radical of a 5-membered heterocycle such as a 2-thiazolyl, 2-benzthiazolyl, 2-imidazolyl or 2-benzimidazolyl radical, or the radical of a 6-membered heterocycle such as a pyridyl radical.

W represents both a group which dissociates acid in water such as the sulfonic acid or carboxyl group, as well as a group which does not dissociate acid in water, e.g. the sulfonic acid amide, sulfonic acid-N-methylamide, methylsulfonyl or ethylsulfonyl group. Preferably W is the sulfonic acid group and $n$ is 1. However, if W represents a group which does not dissociate acid in water, then $n$ is 2. —N=N—G can be bound both to B as well as to D. If there are two such groups (i.e. $m=2$), then preferably one is bound to B and the other to D. In the latter case, the radicals G can be identical or different.

The carbocyclic-aromatic radicals is the compounds of Formulas I, II and III can contain the substituents usual in dyestuffs, for example, nucleophilic substituents such as hydrocarbon groups, particularly lower alkyl groups, ether groups, advantageously lower alkoxy and aryloxy groups, or acylamino groups, e.g. alkanoylamino or aroylamino groups, or electrophilic substituents such as halogens, e.g. fluorine, chlorine or bromine, non-water solubilizing carboxylic acid amide and sulfonic acid amide groups substituted at the introgen atom, in the case of sulfonic acid amide groups, e.g. sulfonic acid-N-arylamide or sulfonic acid-N-alkyl-N-arylamide groups, also carboxylic acid ester or sulfonic acid aryl ester groups, the nitro, cyano or trifluoromethyl group or acyl groups such as lower alkanoyl, aroyl groups, or alkylsulfonyl groups having at least 3 carbon atoms, or arylsulfonyl groups; in addition G can also contain arylazo groups of the carbocyclic or heterocyclic series.

Most of the starting materials of Formula I are known, or they can be produced by known processes, e.g. by coupling the diazonium compound of an optionally O-alkylated or O-acylated o-aminophenol or o-aminonaphthol of the formula

with a naphthylamine of the formula H—E—NH—R which couples in a position adjacent to the amino group, and subsequently converting any alkoxy or acyloxy group present into the hydroxyl group.

The starting materials of Formula II are obtained, for example, by condensation of an o-hydroxyarylamine of the formula

with an o-hydroxyaryl aldehyde of the formula

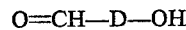

at least one of the components containing the group —N=N—G. This group can be introduced in the known way into the—optionally N - acylated—o-hydroxyarylamine or the o-hydroxyaryl aldehyde by coupling it with a diazonium compound G—N$_2$+. The condensation of the amine with the aldehyde to form the azo-azomethine of Formula II is performed (optionally after saponification of the N-acylated o-hydroxyarylamine) in water or in an organic solvent such as a lower alkanol, an alkylene glycol monoalkyl ether or the amide of a lower fatty acid and, advantageously, in a neutral or weakly akaline medium. The azo-azomethine dyestuff of Formula II can, in many cases, be used directly without having to be isolated for the production of the dyestuffs of Formula III according to the invention.

The simple salts of trivalent chromium, for example, are used as agents giving off chromium such as chromic fluoride, chromic acetate, chromic formate or chromic sulfate or potassium or ammonium chromic sulfate, optionally in the presence of those compounds which, with the chromic salts, can form complex compounds which are soluble in an alkaline medium. Examples of such compounds are tartaric acid, citric acid, lactic acid or salicylic acid. Also however, complex chromic salts can be used, for example, those obtained by reaction of simple chromium salts with compounds capable of complex formation.

The reaction of the agents giving off chromium with the monoazo and azo-azomethine compounds as defined of Formulas I and II is performed, for example, in aqueous slurry, in aqueous solution or in the melt, e.g. in the melt of the alkali metal salt of a lower fatty acid, or in an organic solvent and, optionally, in the presence of acid binding agents such as sodium or potassium acetate or carbonate. Examples of suitable solvents are amides of lower fatty acids such as formamide or dimethyl formamide, or alcohols such as alkanols or alkylene glycols and their lower monoalkyl ethers.

If the monoazo and azo-azomethine dyestuffs as defined are both reacted together with the agents giving off chromium, these dyestuffs are used in about equimolecular proportions.

However, it is advantageous to perform the reaction with the agents giving off chromium in steps. Thus, preferably a monoazo dyestuff of Formula I is first reacted with an agent giving off chromium to form a complex chromium compound which contains 1 molecule of a monoazo dyestuff of Formula I bound in complex linkage to 1 chromium atom. This is done, advantageously, at temperatures from 90–140° C., open or under pressure, particularly in water or in an organic solvent such as an alcohol, and in an acid medium. Then the complex 1:1 chromium compound is reacted with an azo-azomethine dyestuff as defined of Formula II to form the complex chromium compound of Formula III. In many cases, the components, i.e. the corresponding amines and aldehydes, can also be used instead of this azo-azomethine dyestuff.

This operation is advantageously performed in aqueous or organic medium and, with advantage, is the presence of acid binding agents such as sodium or potassium acetate or carbonate or dilute sodium or potassium hydroxide solution.

The following non-limitative examples illustrate the invention. The temperatures are given therein in degrees centigrade. Percentages are given by weight.

Example 1

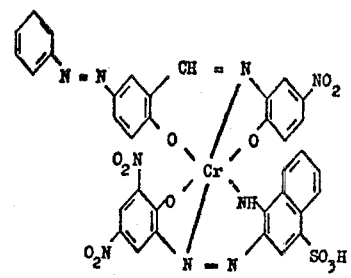

36.2 g. of the azo-azomethine dyestuff obtained by condensation of 1-hydroxy-2-formyl-4-phenylazobenzene with 1-hydroxy-2-amino-4-nitrobenzene are added at about 85°
to a solution of 40 g. of anhydrous sodium carbonate in
1000 ml. of water. 48.3 g. of the 1:1 chromium complex
compound, corresponding to 5.2 g. of chromium and 43.3
g. of the monoazo dyestuff: 1-hydroxy-2-amino-4,6-dinitrobenzene→1-aminonaphthalene-4-sulphonic acid are
added to this solution. The suspension obtained is heated
for 1½ hours at 85–95° whereupon an olive green solution is obtained. The dyestuff formed is salted out with
sodium chloride, filtered off and dried. The dyestuff obtained, corresponding to the above formula, is a dark
powder which dyes wool in olive green shades.

Example 2

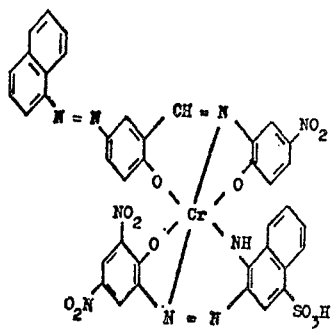

27.6 g. of 1-hydroxy-2-formyl-4-[naphthyl(1')-azo]-benzene are suspended in a solution of 40 g. of anhydrous sodium carbonate in 2000 ml. of water at about 85°
and 15.4 g. of 1-hydroxy-2-amino-4-nitrobenzene and 48.3
g. of the 1:1 chromium complex compound corresponding to 5.2 g. of chromium and 43.3 g. of the monoazo
dyestuff: 1 - hydroxy - 2 - amino - 4,6 - dinitrobenzene→1-
aminonaphthalene-4-sulphonic acid are added. The suspension obtained is heated for 1½ hours at 85–95°. The
dyestuff formed is then salted out, filtered off and dried.
It corresponds to the above formula and is a dark powder
which dyes polyamide fibres, particularly wool, in olive
green shades having good fastness properties.

Example 3

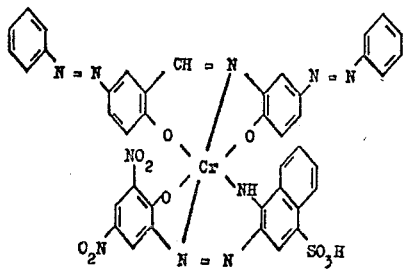

42.1 g. of the azo-azomethine dyestuff obtained by condensation of 1-hydroxy-2-formyl-4-phenylazobenzene with
1-hydroxy-2-amino-4-phenylazobenzene are suspended in
a solution of 40 g. of anhydrous sodium carbonate in
1000 ml. of water at about 85°. 48.3 g. of the 1:1 chromium complex compound corresponding to 5.2 g. of chromium and 43.3 g. of the monoazo dyestuff: 1-hydroxy-2-
amino-4,6-dinitrobenzene→1 - aminonaphthalene - 4 - sulphonic acid are added to this suspension. The reaction
mixture is heated for 1½ hours at 85–95° and after this
time the dyestuff is precipitated by the addition of sodium
chloride. It is a dark powder which dyes wool from a
neutral to weakly acid bath in brown-olive shades having
good fastness properties.

Example 4

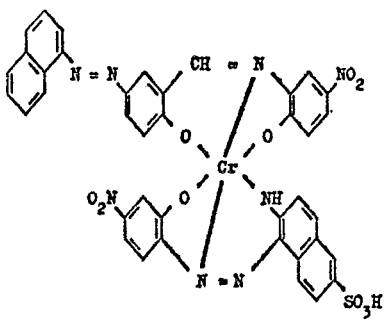

At about 85°, 41.2 g. of the azo-azomethine dyestuff
obtained by condensation of 1-hydroxy-2-formyl-4-[naphthyl(1')-azo]-benzene with 1-hydroxy-2-amino-4-nitrobenzene are suspended in the solution of 1000 ml. of $H_2O$
and 25 g. of solid NaOH. 43.8 g. of the 1:1 chromium
complex compound corresponding to 5.2 g. of chromium
and 38.8 g. of the monoazo dyestuff: 1-hydroxy-2-amino-
5-nitrobenzene→2-amino naphthalene-6-sulphonic acid
are added. The mixture is heated for 1½ hours at 85–
95° whereupon an olive green solution is formed. The
dyestuff formed is salted out with sodium chloride, filtered off and dried. It is a dark powder which dyes wool
from a neutral to weakly acid bath in olive green shades
having good fastness properties.

Example 5

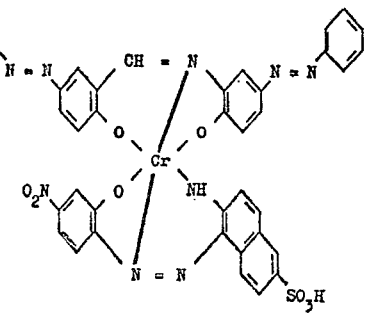

42.1 g. of the azo-azomethine dyestuff obtained by
condensation of 1-hydroxy-2-formyl-4-phenylazobenzene
and 1-hydroxy-2-amino-4-phenylazobenzene are dissolved
in a mixture of 600 ml. of water, 600 ml. of ethylene
glycol monomethyl ether and 40 g. of anhydrous sodium
carbonate at 85°. 43.8 g. of the 1:1 chromium complex
compound corresponding to 5.2 g. of chromium and 38.8
g. of the monoazo dyestuff: 1-hydroxy-2-amino-5-nitrobenzene→2-amino-naphthalene-6-sulphonic acid are added to this solution. The mixture is heated for 1½ hours
at 85–95° whereupon a dark green dyestuff solution is
formed. The dyestuff is salted out by the addition of sodium chloride, filtered off and dried. It is a dark powder
which dyes wool from a neutral to weakly acid bath in
brownish olive shades having good fastness properties.

Example 6

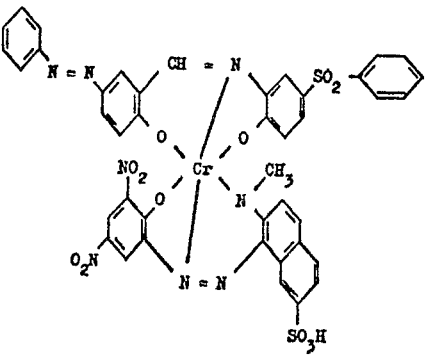

45.7 g. of the azo-azomethine dyestuff obtained by condensation of 1-hydroxy-2-formyl-4-phenylazobenzene with 1-hydroxy-2-amino-4-phenylsulphonylbenzene are suspended in a solution of 40 g. of anhydrous sodium carbonate in 1000 ml. of water at about 85°. Also 49.7 g. of the 1:1 chromium complex compound corresponding to 5.2 g. of chromium and 44.7 g. of the monoazo dyestuff: 1-hydroxy-2-amino-4,6-dinitrobenzene→2-methyl-aminonaphthalene-7-sulphonic acid are added. The mixture obtained is heated for 1½ hours at 85–95° whereupon an olive green solution is formed. The dyestuff formed is salted out with sodium chloride, filtered off and dried. The dyestuff obtained corresponds to the above formula. It is a dark powder which dyes wool from a neutral to weakly acid bath in yellowish olive shades having good fastness properties.

Example 7

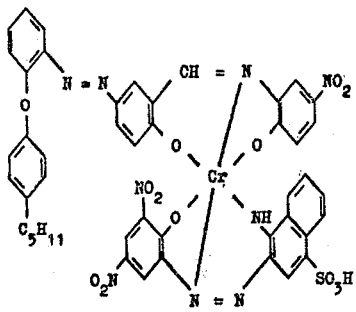

52.4 g. of the azo-azomethine dyestuff obtained by condensation of 1-hydroxy-2-formyl-4-[2'-(4''-amyl-phenoxy)-phenylazo]-benzene with 1-hydroxy-2-amino-4-nitrobenzene are dissolved in a mixture of 1000 ml. of water, 500 ml. of ethylene glycol monomethyl ether and 40 g. of anhydrous sodium carbonate at about 85°. 48.3 g. of the 1:1 chromium complex compound corresponding to 5.2 g. of chromium and 43.3 g. of the monoazo dyestuff: 1-hydroxy-2-amino-4,6-dinitrobenzene→1-aminonaphthalene-4-sulphonic acid are then added. The suspension so obtained is heated for 1½ hours at 85–95° whereupon an olive green solution is formed. The dyestuff is salted out with sodium chloride, filtered off and dried. It is a dark powder which dyes wool from a neutral to weakly acid bath in olive green shades having good fastness properties.

Example 8

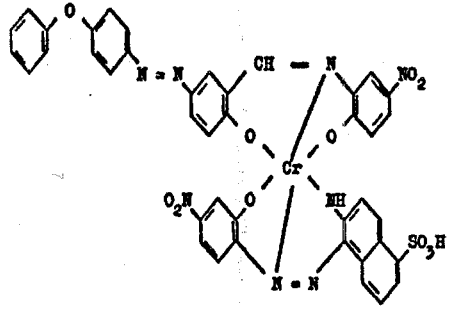

45.4 g. of the azo-azomethine dyestuff obtained by condensation of 1-hydroxy-2-formyl-4-(4'-phenoxyphenylazo)-benzene with 1-hydroxy-2-amino-4-nitrobenzene are dissolved in a mixture of 1000 ml. of water, 500 ml. of ethylene glycol monomethyl ether and 40 g. of anhydrous sodium carbonate at about 85°. 43.8 g. of the 1:1 chromium complex compound corresponding to 5.2 g. of chromium and 38.8 g. of the monoazo dyestuff: 1-hydroxy - 2 - amino - 5 - nitrobenzene→2 - amino - naphthalene-5-sulphonic acid are then added. The suspension obtained is heated for 1½ hours at 85–95° whereupon an olive green solution is formed. The dyestuff is then salted out with sodium chloride, filtered off and dried. It is a dark powder which dyes wool from a neutral to weakly acid bath in olive shades having good fastness properties.

If, instead of the azo-azomethine dyestuff mentioned above, one of those given in column II of the following table is used and, if instead of the 1:1 chromium complex compound given, a 1:1 chromium complex compound of one of the azo dyestuffs given in column III of the same table is used and otherwise the same procedure as given in Example 8 is followed, then corresponding 2:1 chromium complex compounds are obtained which have the shades given in column IV of this table. The azo-azomethine dyestuffs given in the table are produced by condensing the corresponding aldehydes with the aminophenols.

TABLE

| I No. | II Azo-azomethine dyestuff | III Azo dyestuff | IV Shade of the 2:1 Chromium complex compound on wool |
|---|---|---|---|
| 9 | ![structure] | ![structure] | Greenish olive. |
| 10 | Same as No. 9 | ![structure] | Green. |
| 11 | ----do---- | ![structure] | Brownish olive. |

TABLE—Continued
| I No. | II Azo-azomethine dyestuff | III Azo dyestuff | IV Shade of the 2:1 Chromium complex compound on wool |
|---|---|---|---|
| 12 | Same as No. 9 | 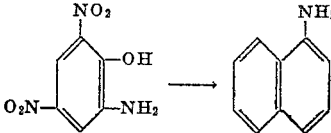 | Olive. |
| 13 | do | 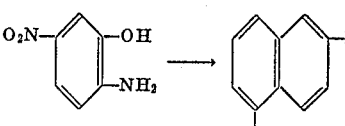 | Green. |
| 14 | do | 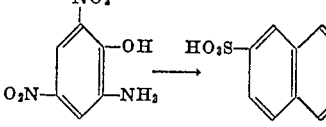 | Olive. |
| 15 | do | 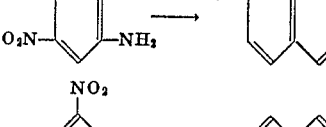 | Do. |
| 16 | 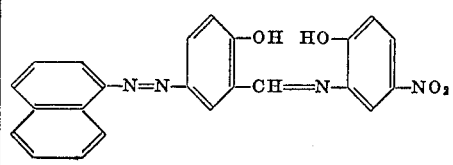 | 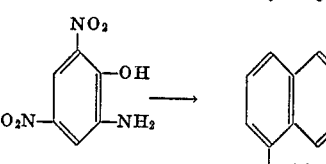 | Brownish olive. |
| 17 | Same as No. 16 | 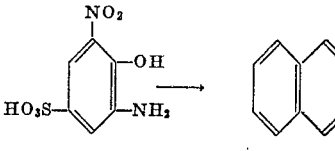 | Do. |
| 18 | do | 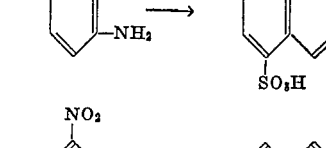 | Yellowish green. |
| 19 | do | 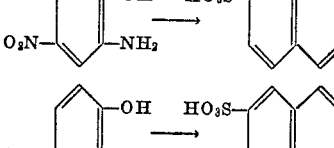 | Brownish olive. |
| 20 | do | 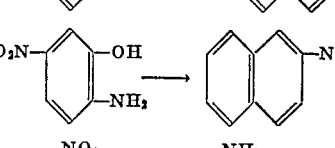 | Do. |
| 21 | 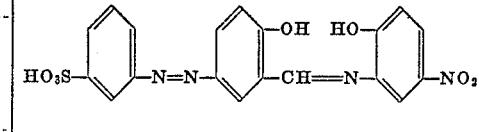 | 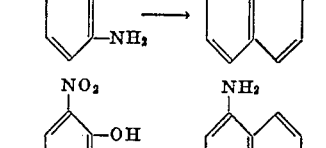 | Green. |
| 22 | 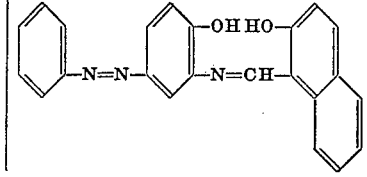 | 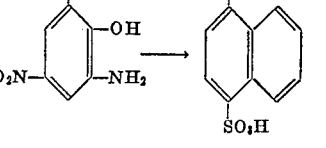 | Brown. |

TABLE—Continued

| I No. | II Azo-azomethine dyestuff | III Azo dyestuff | IV Shade of the 2:1 Chromium complex compound on wool |
|---|---|---|---|
| 23 | [structure: phenoxy-phenyl-N=N-phenyl(OH)-CH=N-phenyl(OH)-NO₂] | [structure: dinitro-OH-NH₂-benzene → amino-naphthalene-SO₃H] | Yellowish olive. |
| 24 | Same as No. 23 | [structure: O₂H-OH-NH₂-benzene → amino-naphthalene with HO₃S] | Green. |
| 25 | do | [structure: NO₂-OH-NH₂-benzene with O₂H → amino-naphthalene-SO₃H] | Yellowish olive. |
| 26 | do | [structure: dinitro-OH-NH₂-benzene → HO₃S-naphthalene-NH-CH₃] | Brownish olive. |
| 27 | [structure: phenyl-N=N-phenyl(OH)-N=CH-phenyl(OH,NO₂,NO₂)] | [structure: dinitro-OH-NH₂-benzene → amino-naphthalene-SO₃H] | Olive. |
| 28 | [structure: phenyl-N=N-phenyl(OH)-CH=N-phenyl(OH,NO₂)] | [structure: dinitro-OH-NH₂-benzene → amino-naphthalene-SO₃H] | Brownish olive. |
| 29 | [structure: ethyl-phenyl-N=N-phenyl(OH)-CH=N-phenyl(OH)-N=N-phenyl, with C₂H₅] | [structure: dinitro-OH-NH₂-benzene → amino-naphthalene-SO₃H] | Green. |
| 30 | [structure: C₅H₁₁-phenyl-O-phenyl-N=N-phenyl(OH)-CH=N-phenyl(OH)-NO₂] | [structure: dinitro-OH-NH₂-benzene → amino-naphthalene-SO₃H] | Do. |
| 31 | [structure: phenoxy-phenyl-N=N-phenyl(OH)-N=CH-phenyl(OH)] | [structure: dinitro-OH-NH₂-benzene → amino-naphthalene-SO₃H] | Olive. |
| 32 | [structure: Cl-phenyl-N=N-phenyl(OH)-N=CH-phenyl(OH)-NO₂] | [structure: dinitro-OH-NH₂-benzene → amino-naphthalene-SO₃H] | Do. |

TABLE—Continued

| I No. | II Azo-azomethine dyestuff | III Azo dyestuff | IV Shade of the 2:1 Chromium complex compound on wool |
|---|---|---|---|
| 33 | (phenyl)-N=N-(OH)C6H3-CH=N-C6H3(OH)-NO2 | 2,4-dinitro-6-aminophenol → 2-amino-naphthalene-sulfonic acid (SO3H) | Olive. |
| 34 | (2-Cl-phenyl)-N=N-(OH)C6H3-CH=N-C6H3(OH)-Cl | 2-nitro-6-amino-phenol → 4-amino-naphthalene-sulfonic acid | Green. |
| 35 | (4-Br-phenyl)-N=N-(OH)C6H3-CH=N-C6H3(OH)-CH3 | Same as No. 34 | Do. |
| 36 | (4-H5C2O-phenyl)-N=N-(OH)C6H3-CH=N-C6H2(OH)(NO2)-CH3 | ...do | Brownish olive. |
| 37 | (2-OCH3-phenyl)-N=N-(OH)C6H3-CH=N-C6H2(OH)(NO2)-NO2 | ...do | Olive. |
| 38 | (phenyl)-N=N-(OH)C6H3-CH=N-C6H2(OH)(NHCOCH3)-NO2 | ...do | Do. |
| 39 | (phenyl)-N=N-(OH)C6H3-CH=N-C6H2(OH)(NO2)-Cl | ...do | Brownish olive. |
| 40 | (1-naphthyl)-N=N-(OH)C6H3-N=CH-C6H3(OH)-CH3 | ...do | Olive. |
| 41 | (4-SO3H-phenyl)-N=N-(OH)C6H3-N=CH-(OH)C6H3-N=N-(phenyl-SO2-phenyl) | 2-nitro-6-amino-phenol → 2-amino-naphthalene | Greenish olive. |
| 42 | (phenyl)-N=N-(OH)(CH3)C6H2-N=CH-(OH)C6H3-N=N-(4-CH3SO2-phenyl) | 2,4-dinitro-6-amino-phenol → 4-amino-naphthalene-sulfonic acid | Do. |
| 43 | (2-COOH-phenyl)-N=N-(OH)C6H3-CH=N-C6H3(OH)-NO2 | 2-nitro-6-amino-phenol → 2-amino-naphthalene | Olive. |

TABLE—Continued

| I No. | II Azo-azomethine dyestuff | III Azo dyestuff | IV Shade of the 2:1 Chromium complex compound on wool |
|---|---|---|---|
| 44 | [structure: COOH-C6H4-N=N-C6H3(OH)-CH=N-C6H3(HO)-Cl] | Same as No. 43 | Olive. |
| 45 | [structure: C6H5-N=N-C6H3(OH)-CH=N-C6H3(HO)-NO2] | [structure: SO2CH3-C6H3(OH)(NH2) → naphthalene-NH2] | Do. |
| 46 | [structure: Cl-C6H4-N=N-C6H3(OH)-CH=N-C6H3(HO)-N=N-C6H4-Cl] | [structure: NO2,O2N-C6H2(OH)(NH2) → aminonaphthalene-SO3H] | Do. |
| 47 | [structure: OCH3-C6H4-N=N-C6H3(OH)-CH=N-C6H3(HO)-N=N-C6H4-Cl] | [structure: NO2,O2N-C6H2(OH)(NH2) → aminonaphthalene-SO3H] | Do. |
| 48 | [structure: Cl-C6H4-N=N-C6H3(OH)-CH=N-C6H3(HO)-N=N-C6H4-OCH3] | Same as No. 47 | Do. |
| 49 | [structure: (CH3)2-C6H3-N=N-C6H3(OH)-CH=N-C6H3(HO)-NO2] | do | Greenish olive. |
| 50 | [structure: C6H5-N=N-C6H4-N=N-C6H3(OH)-CH=N-C6H3(HO)-NO2] | do | Brownish olive. |
| 51 | [structure: NO2-C6H4-N=N-C6H3(OH)-CH=N-C6H3(HO)-NO2] | do | Olive. |
| 52 | [structure: (NO2)2-C6H3-N=N-C6H3(OH)-CH=N-C6H3(HO)-NO2] | do | Do. |
| 53 | [structure: NO2-C6H4-N=N-C6H3(OH)-CH=N-C6H3(HO)-NO2] | [structure: NO2,O2N-C6H2(OH)(NH2) → H2N-naphthalene-SO2-NH2] | Do. |
| 54 | [structure: benzothiazolyl-N=N-C6H3(OH)-CH=N-C6H3(HO)-NO2] | [structure: NO2,O2N-C6H2(OH)(NH2) → aminonaphthalene-SO3H] | Do. |

TABLE—Continued

| I No. | II Azo-azomethine dyestuff | III Azo dyestuff | IV Shade of the 2:1 Chromium complex compound on wool |
|---|---|---|---|
| 55 | | | Olive. |
| 56 | | | Do. |
| 57 | | Same as No. 56 | Do. |
| 58 | | | Redbrown. |
| 59 | | Same as No. 58 | Do. |
| 60 | | | Olive. |
| 61 | | | Do. |
| 62 | | | Brown. |
| 63 | | | Olive. |
| 64 | Same as No. 63 | | Do. |

TABLE—Continued

| I No. | II Azo-azomethine dyestuff | III Azo dyestuff | IV Shade of the 2:1 Chromium complex compound on wool |
|---|---|---|---|
| 65 | Same as No. 63 | NO$_2$, OH, Br, NH$_2$ → HO$_3$S-naphthyl-NH$_2$ | Olive. |
| 66 | Cl-C$_6$H$_4$-O-C$_6$H$_4$-N=N-C$_6$H$_3$(OH)-CH=N-C$_6$H$_3$(OH)-NO$_2$ | NO$_2$, OH, O$_2$N, NH$_2$ → NH$_2$-naphthyl-SO$_3$H | Yellowish olive. |
| 67 | CH$_3$-C$_6$H$_4$-O-C$_6$H$_4$-N=N-C$_6$H$_3$(OH)-CH=N-C$_6$H$_3$(OH)-NO$_2$ | Same as No. 66 | Do. |
| 68 | C$_6$H$_5$-SO$_2$-C$_6$H$_4$-N=N-C$_6$H$_3$(OH)-CH=N-C$_6$H$_3$(OH)-NO$_2$ | do | Olive. |
| 69 | Cl-C$_6$H$_4$-SO$_2$-C$_6$H$_4$-N=N-C$_6$H$_3$(OH)-CH=N-C$_6$H$_3$(OH)-NO$_2$ | do | Do. |
| 70 | CH$_3$-C$_6$H$_4$-SO$_2$-C$_6$H$_4$-N=N-C$_6$H$_3$(OH)-CH=N-C$_6$H$_3$(OH)-NO$_2$ | do | Do. |
| 71 | C$_6$H$_5$-N=N-C$_6$H$_3$(OH)-CH=N-C$_6$H$_3$(OH)-SO$_3$H | O$_2$N, OH, NH$_2$ → naphthyl-NH$_2$ | Do. |
| 72 | CH$_3$SO$_2$-C$_6$H$_3$(Cl)-N=N-C$_6$H$_3$(OH)-CH=N-C$_6$H$_3$(OH)-N=N-C$_6$H$_3$(Cl) | NO$_2$, OH, O$_2$N, NH$_2$ → NH$_2$-naphthyl-SO$_3$H | Do. |
| 73 | C$_6$H$_5$-N=N-C$_6$H$_3$(OH)-CH=N-C$_6$H$_3$(OH)-N=N-C$_6$H$_5$ | NO$_2$, OH, O$_2$N, NH$_2$, SO$_3$H → naphthyl-NH$_2$ | Khaki. |
| 74 | (CH$_3$)$_2$NSO$_2$-C$_6$H$_4$-N=N-C$_6$H$_3$(OH)-CH=N-C$_6$H$_3$(OH)-NO$_2$ | NO$_2$, OH, O$_2$N, NH$_2$ → NH$_2$-naphthyl-SO$_2$NH$_2$ | Olive. |
| 75 | C$_6$H$_5$-N=N-C$_6$H$_3$(OH)-CH=N-C$_6$H$_2$(NO$_2$)(OH)-SO$_2$CH$_3$ | NO$_2$, OH, NH$_2$ → NH$_2$-naphthyl-SO$_3$H | Do. |

TABLE—Continued

| I No. | II Azo-azomethine dyestuff | III Azo dyestuff | IV Shade of the 2:1 Chromium complex compound on wool |
|---|---|---|---|
| 76 | (structure with -SO2-, -OH HO-, -CH=N-, -N=N- phenyl) | (structure: NO2, OH, O2N-, NH2 coupling with naphthalene-NH2, SO3H) | Olive. |
| 77 | (structure with -N=N-, -OH HO-, -CH=N-, NH-COCH3, -NO2) | Same as No. 76 | Do. |

Example 78

2 g. of the dyestuff according to Example 4 are dissolved in 4000 ml. of water and 100 g. of previously well wetted wool are introduced into the dyebath at 40–50°. 2 g. of 40% acetic acid are then added to the bath whereupon it is brought to the boil within half an hour and kept at the boil for 45 minutes. The wool is then rinsed with cold water and dried. The green wool dyeing has excellent fastness to light.

Example 79

100 g. of well dampened wool are introduced at a temperature of about 45° into a dyebath consisting of a solution of 2 g. of the dyestuff of Example 2 in 4000 ml. of water. 3 g. of ammonium sulfate are then added to the dyebath; the whole is heated to boiling within 30 minutes and kept for 45 minutes at the boil. The wool is then rinsed with cold water and dried. The olive green dyeing obtained is excellently lightfast.

Example 80

100 g. of well dampened silk are introduced at a temperature of about 45° into a dyebath of a solution of 2 g. of the dyestuff of Example 7 in 4000 ml. of water. 2 g. of 40% acetic acid are added to the dyebath which is then heated within half an hour to boiling and kept at the boil for 45 minutes. The silk is then rinsed with water and dried. The olive green dyeing obtained is very lightfast.

Example 81

100 g. of polyamide fabric are introduced at a temperature of 40–50° into a dyebath which has been prepared by dissolving 2 g. of the dyestuff of Example 45 in 4000 ml. of water and adding 2 g. of the type of auxiliary which is the condensation product of a fatty alcohol ($C_{11}$–$C_{18}$) with (15–20 molecular equivalents of) ethyl oxide, as well as 2 g. of ammonium sulfate. The dyebath is heated within half an hour to boiling and kept for one hour at the boil. The fabric is then rinsed with water and dried. The olive green dyeing obtained is excellently lightfast.

We claim:
1. A dyestuff of the formula

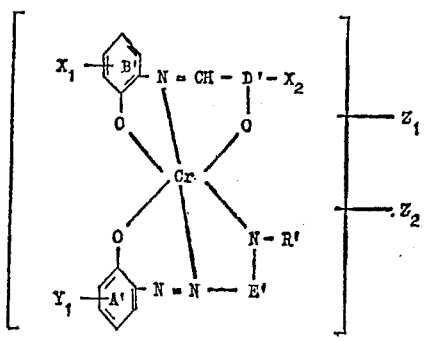

wherein D' represents phenyl or

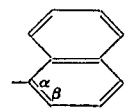

linked in α-position to —CH=, and in β-position to the adjacent oxygen bridge,

represents

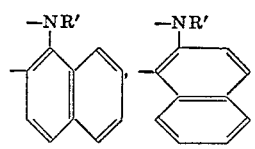

or

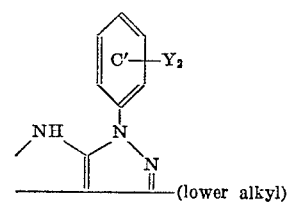

R' represents hydrogen, lower alkyl, hydroxy-lower alkyl or phenyl, one of $X_1$ and $X_2$ represents the grouping G'—N=N— and the other X represents G'—N=N— or hydrogen, nitro, halogen, phenylsulfonyl or lower alkanoylamino, G' represents phenyl, halogen-substituted phenyl, lower alkyl-substituted phenyl, nitrophenyl, lower alkoxyphenyl, phenoxyphenyl, lower alkylphenoxyphenyl, halogen - substituted phenoxyphenyl, phenyl - sulfonylphenyl, lower alkyl-substituted phenyl-sulfonyl-phenyl or halogen-substituted phenyl-sulphonyl-phenyl, naphthyl or 2-benzothiazolyl, $Y_1$ represents hydrogen, nitro, halogen or lower alkyl, $Y_2$ represents hydrogen or halogen, $Z_1$ represents sulfo, carboxyl, sulfamyl, lower alkyl-sulfonyl or N-lower alkyl-substituted sulfamyl, and $Z_2$ represents hydrogen or sulfamyl, lower alkylsulfamyl or N-lower alkyl-substituted sulfamyl, each of $Z_1$ and $Z_2$ being linked to an aromatic ring carbon atom of A', B', C', D', E' or G'.

2. A dyestuff of the formula

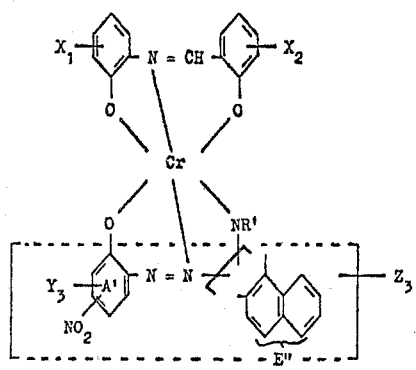

(IB)

wherein one of $X_1$ and $X_2$ represents the grouping G'—N=N— and the other X represents G'—N=N— or hydrogen, nitro, halogen, phenylsulfonyl or lower alkanoylamino, G' represents phenyl, halogen-substituted phenyl, lower alkyl-substituted phenyl, nitrophenyl, lower alkoxyphenyl, phenoxyphenyl, lower alkylphenoxyphenyl, halogen-substituted phenoxyphenyl, phenyl-sulfonylphenyl, lower alkyl-substituted phenyl-sulfonyl-phenyl or halogen-substituted phenyl-sulphonyl-phenyl, naphthyl or 2-benzothiazolyl, or R' represents hydrogen, lower alkyl, phenyl, hydroxy-lower alkyl, $Y_3$ represents hydrogen or nitro, and $Z_3$ represents —$SO_3H$ linked to one of the aromatic ring carbon atoms of benzene nucleus A or naphthalene nucleus E''.

3. A dyestuff which in its free acid form is of the formula:

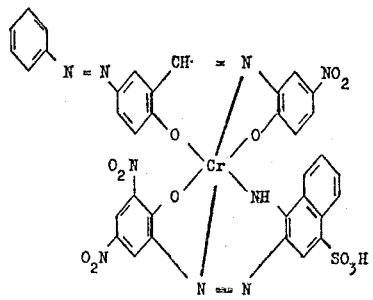

4. A dyestuff which in its free acid form is of the formula:

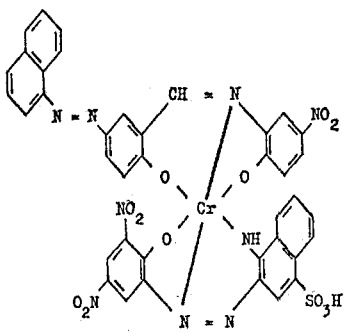

5. A dyestuff which in its free acid form is of the formula:

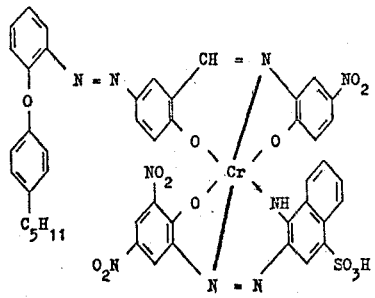

6. A dyestuff which in its free acid form is of the formula:

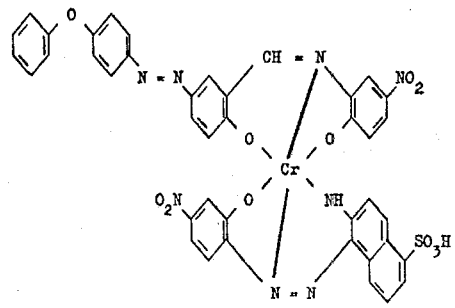

7. A dyestuff which in its free acid form is of the formula:

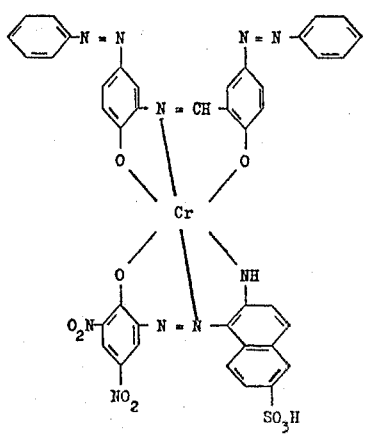

8. A dyestuff which in its free acid form is of the formula:
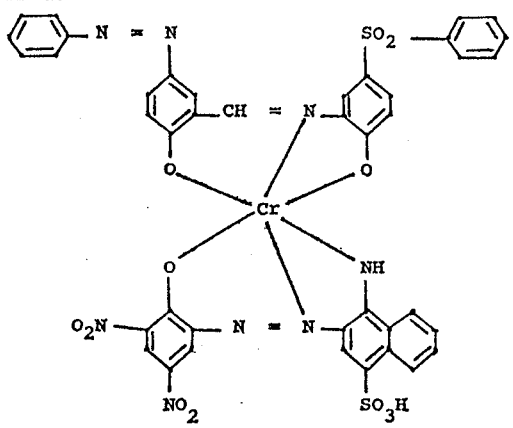
9. A dyestuff which in its free acid form is of the formula:
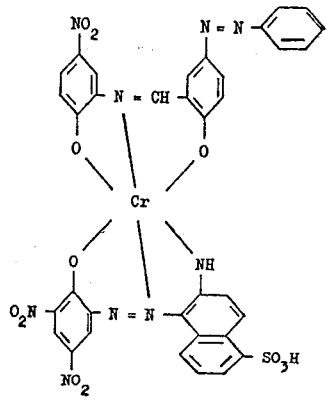
10. A dyestuff of the formula:
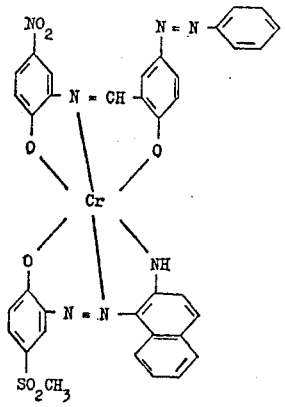
References Cited
UNITED STATES PATENTS
2,985,646  5/1961  Schetty et al. _____ 260—145
FOREIGN PATENTS
565,697  9/1958  Belgium.
OTHER REFERENCES
Stright et al., Dyestuffs, vol. 44, No. 8, June 1963, pp. 252–8.
CHARLES B. PARKER, *Primary Examiner.*
D. PAPUGA, *Assistant Examiner.*